Figure 1:
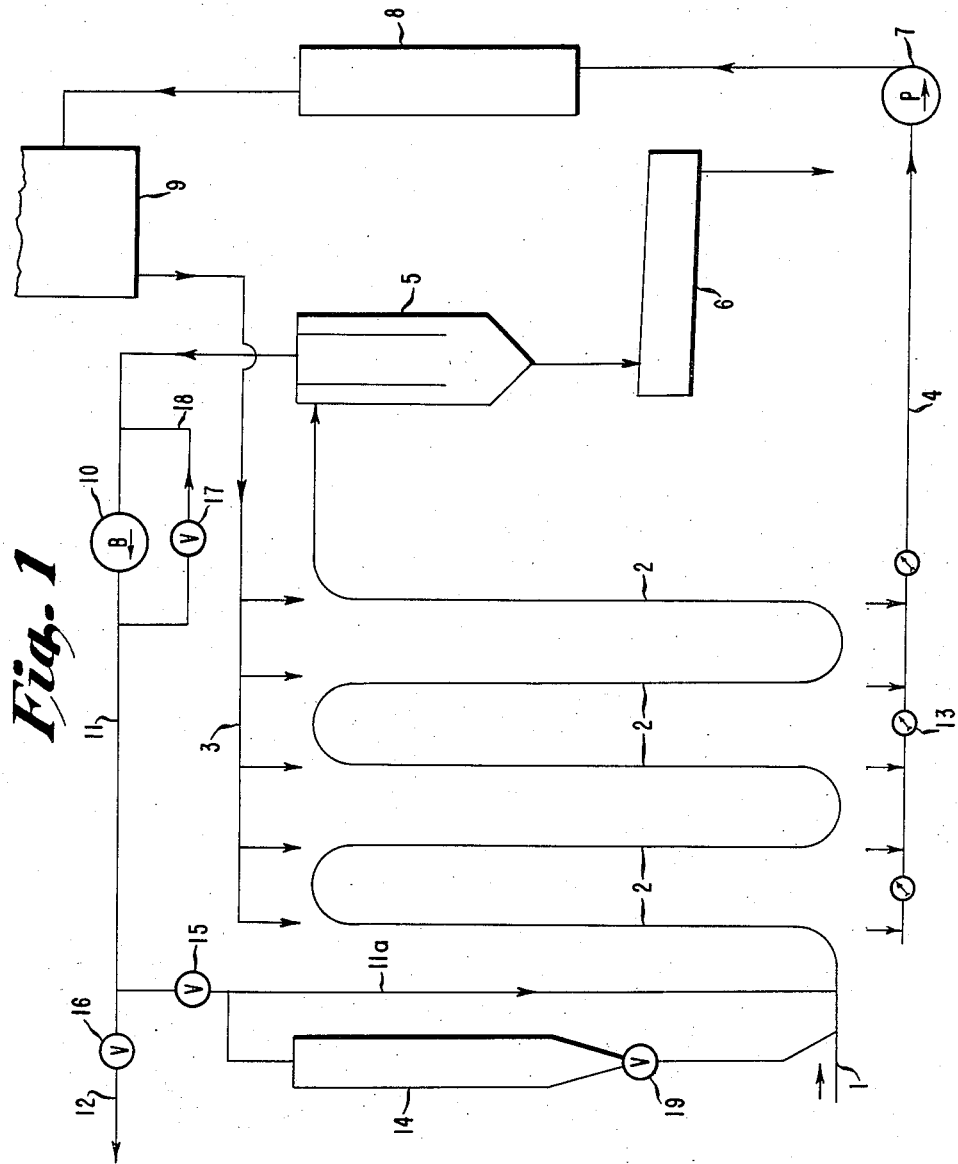

May 6, 1958 I. J. KRCHMA 2,833,627
METHOD FOR COOLING THE HOT, GAS-CONTAINING REACTION
PRODUCTS RESULTING FROM THE OXIDATION OF
TITANIUM TETRACHLORIDE
Filed Jan. 3, 1956 2 Sheets-Sheet 1

INVENTOR
IGNACE J. KRCHMA

BY Francis J. Crowley
ATTORNEY

May 6, 1958 I. J. KRCHMA 2,833,627
METHOD FOR COOLING THE HOT, GAS-CONTAINING REACTION
PRODUCTS RESULTING FROM THE OXIDATION OF
TITANIUM TETRACHLORIDE
Filed Jan. 3, 1956 2 Sheets-Sheet 2

INVENTOR
IGNACE J. KRCHMA

BY Francis J. Crowley
ATTORNEY

United States Patent Office 2,833,627
Patented May 6, 1958

2,833,627
METHOD FOR COOLING THE HOT, GAS-CONTAINING REACTION PRODUCTS RESULTING FROM THE OXIDATION OF TITANIUM TETRACHLORIDE

Ignace J. Krchma, Wilmington, Del., assignor to E. I. du Pont de Nemours and Company, Wilmington, Del., a corporation of Delaware Application January 3, 1956, Serial No. 556,977

4 Claims. (Cl. 23—202)

This invention pertains to the manufacture of titanium dioxide pigments. More particularly, it pertains to an improvement in the process for oxidizing titanium tetrachloride to titanium dioxide, especially to the step of cooling the hot reaction products.

In one of the more recently developed methods for producing titanium dioxide pigment, which is described in U. S. Patent 2,488,439, vaporized and preheated titanium tetrachloride is fed to a high temperature reaction zone where it is mixed with oxygen or oxygen-containing gases. The oxygen and the titanium tetrachloride react to form chlorine and solid particles of titanium dioxide, and the latter is carried from the reaction zone in a mixture of chlorine and residual gases. This exiting suspension is usually at temperatures considerably in excess of 1000° C.; and due to this high temperature and the corrosive nature of the gases present, it cannot be handled satisfactorily in any known equipment for the separation of solids from gases. Consequently, it is necessary to cool this suspension before the separation step. One method of cooling consists of passing the hot, gas-containing reaction products through a heat exchanger which is in effect a long conduit or pipe having cooled walls. For reasons of space economy, and sturdy construction, this pipe is usually set up as a plurality of vertical components connected in series by U bends. It is fabricated from any suitable metal which has good thermal conductivity and resistance to corrosion, such as nickel or aluminum, and it is liquid-cooled. Water seems to be the most effective and available cooling medium for use in this heat exchange unit, and it is usually passed through a jacket which surrounds the conduit.

The wall of the conduit serves as the heat transfer surface, and there are many factors which can cause its deterioration. Among these are internal corrosion from the passing materials, external corrosion from the coolant, abrasion from the suspended solid particles especially where the system suddenly changes direction, and burning through as a result of improper cooling. In view of these destructive forces, it is inevitable that leaks will eventually occur. A leakage of water into the gas stream carrying the pigment particles is very damaging to the system, and any appreciable quantity will cause plugging of the system, thus resulting in an expensive shut-down.

It is, therefore, an object of this invention to provide a novel process for preventing an inleakage of water through a faulty, liquid-cooled conduit carrying the hot reaction products from the oxidation of titanium tetrachloride. It is another object of this invention to provide a process for quickly detecting leaks in this system.

These objects and others are attained by this invention which comprises passing the gas-containing reaction products resulting from the oxidation of titanium tetrachloride through a conduit while contacting the exterior of the conduit with a continuously supplied aqueous cooling liquid maintained at a pressure less than the adjacent pressure of the passing gas within said conduit, and continuously removing cooling liquid from contact with the conduit. To give positive contact of the cooling liquid with the conduit, the liquid is contained in surrounding enclosures such as tanks and jackets. Since the gas pressure must decrease along the conduit in order to maintain flow, the water pressure at any particular point of contact must be maintained below the adjacent gas pressure; i. e., the pressure of the gas directly opposite the particular point of contact. In the event of a leak under these conditions, the reaction products will pass into the cooling water instead of the water leaking into the reaction products zone. Although leaks of any kind are undesirable, the contamination of the cooling water is preferred to the more damaging leaking of water into the cooling zone. In addition to the prevention of inleakage of water, this invention also makes it possible to quickly detect an outward leak from the conduit when it occurs. This is accomplished by inserting in the cooling water, means which periodically or continuously analyzes it for contamination. Such detecting means can consist of an acid indicator in the water, or an apparatus which continually measures pH, since a leak in the system will result in the water becoming acidic. It could also consist of a turbidimeter which would indicate the presence of pigment in the water, or it could be a periodic qualitative analysis. Any means, preferably quite rapid, for detecting the presence in the cooling liquid of contamination coming from the gas stream may be used.

The pigment-gas suspension is usually conveyed through the cooling conduit with the help of a blower, and by the use of valves and controlled blower speeds, it is possible to regulate the pressure within the cooling zone. Convenient means have also been found to regulate the water pressure and keep it below the gas pressure within the conduit. Water which is contained is kept at the desired pressure by controlling its head (height). Subatmospheric pressure below the gas pressure of the conduit may be obtained by withdrawing the water through a suction pump or by the use of a suction pump and an interconnected barometric leg which receives the discharged water. The maximum gas pressure in the process of this invention is limited only by the choice of construction materials and the capacity of the blower in the system. However, for practical purposes, pressures in the vicinity of atmospheric or slightly above are preferred. When the gas pressure is below atmospheric, a pump is used in the manner described above.

In a preferred embodiment, the invention comprises passing the gas-containing reaction products from the oxidation of titanium tetrachloride through a conduit while contacting the exterior of said conduit with continuously-supplied water contained in a series of top-vented jackets at such a level that its pressure is less than the adjacent pressure of the passing gases within the conduit. At the same time, water is also continuously flowed through said jackets and analyzed to detect any contamination by the materials from within said conduit.

Figure 1 is presented to describe an embodiment of the pigment cooling operation. The hot suspension of pigment in the chlorine-containing gas comes from the reactor (which is not shown) through line 1 and enters the cooling conduit 2. Prior to entering the conduit the hot suspension may be precooled by mixing it with cooled recycled gas from return pipe 11a. The use of cooling gases in this manner is disclosed in U. S. Patent 2,508,272 issued to J. E. Booge. The cooling conduit 2 is jacketed for water cooling as shown in detail in Figure 2. The cooling water is allowed to flow from the header 3 through these special jackets at hydrostatic pressures which are less than the gas pressure within conduit 2, and then it is passed to collector pipe 4 and through monitors 13 where any contamination from the reaction products is detected. The water then goes to pump 7 and through a heat exchanger 8 where the water is cooled to the desired temperature for storage in tank 9 and subsequent re-use. The cooled pigment suspension is separated in cyclone separator 5, and the pigment is then calcined in calciner 6 and recovered. The separated gas fraction containing the chlorine values then goes through blower 10 to line 11. The portion of this gas recycled through line 11a may vary according to procedures in U. S. Patent 2,508,272, or the pre-cooling may be eliminated by turning all effluent gas through line 12 for re-use in further chlorination of raw materials. The proper pressures and circulation of gases in the apparatus are controlled by calibrated or metering valves 15, 16 and 17. The valve 17 on the blower recycle line 18, is controlled by standard pressure sensing means to provide the desired pressure differential across the blower. Special scrubbing solids, such as sand or coarse $TiO_2$, to keep the inner walls of the conduit free from adhering pigment, can be periodically supplied to the gas stream during the operation from hopper 14 through star valve 19.

Figure 2:
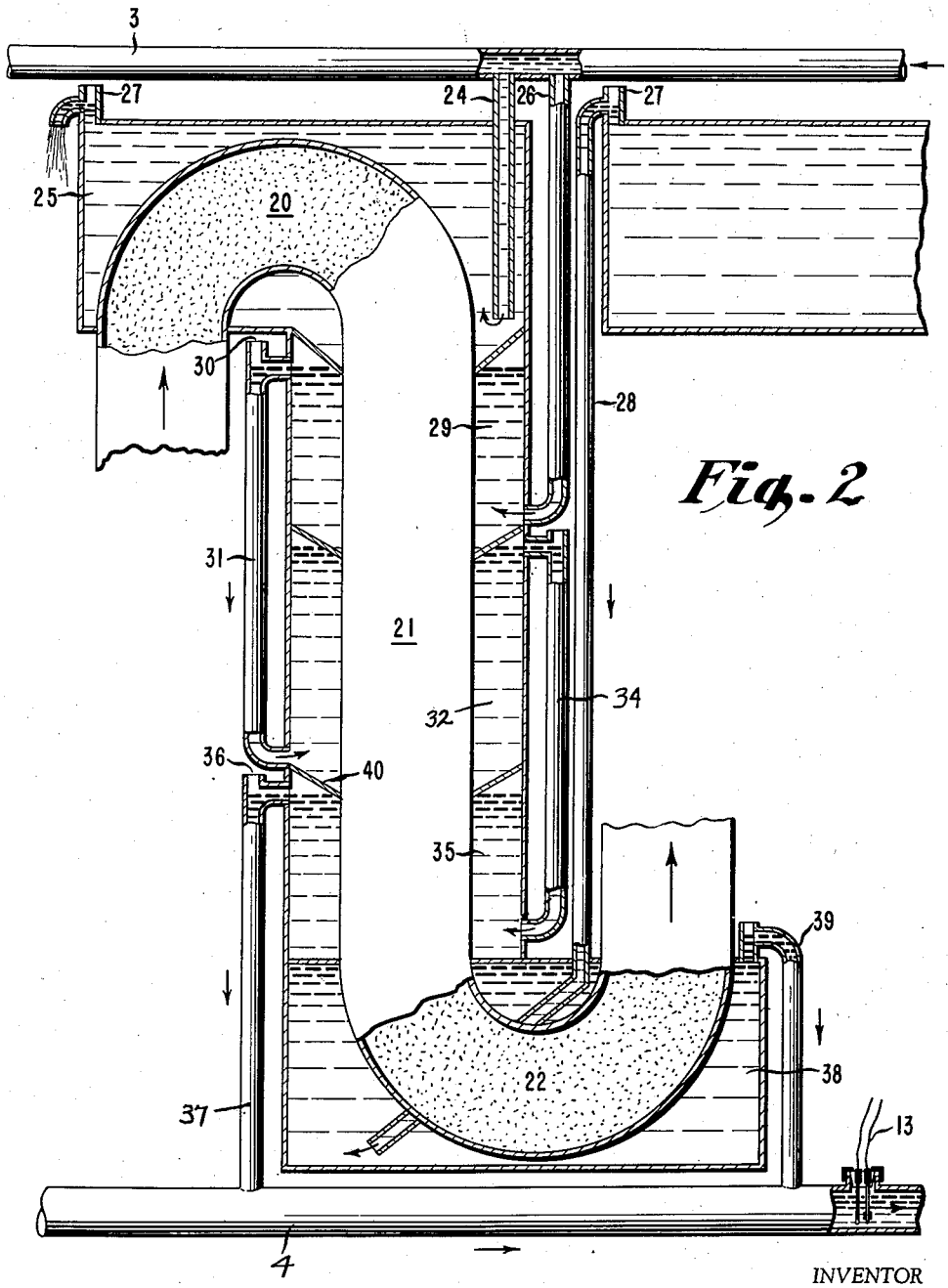

Figure 2 shows in detail a preferred arrangement for one set of the plurality of cooling jackets of the conduit 2 in Figure 1. The hot suspension flows through the bend 20, down leg 21 and through bend 22. Cooling water is fed from header 3 through pipe 24 to the bottom of the box jacket 25 mounted to envelop the bend. The water leaves the box near an air vent 27 which prevents syphoning and consequent irregular flows, and drops freely to a lower jacket on an adjoining leg, which is similar in construction to box jacket 38, about bottom bend 22 which overflows at 39 to the collecting pipe 4. The cylindrical jackets 29, 32 and 35 are arranged in series, and jacket 29 is fed from pipe 26. This jacket flows to the bottom of lower jacket 32 through downpipe 31, and jacket 32 overflows in the same manner through downpipe 34 into jacket 35 which overflows into line 4 through downpipe 37. The air vents 30, 33 and 36 prevent complete filling of the system which would result in either a hydrostatic pressure greater than the gas pressure, or a barometric leg effect. This barometric leg effect, unless carefully controlled, results in very low pressures in the upper portions of the jacket, and at such lowered pressures, boiling can take place thus preventing a portion of the conduit wall from being in contact with the cooling liquid. The ultimate result is a burning of the wall. The apparatus 13 illustrates a continuous sampling device with pH electrodes installed. Each series of jackets is preferably monitored by such a device in order to more quickly locate the leak. The maximum hydrostatic pressure in any of the top-vented water jackets will correspond to the depth of water below the overflow. Lower jacket pressures are therefore achieved by using more but shallower jackets. It is preferably, especially in the hotter zones, that these jackets be arranged so that substantially all of the conduit wall is externally contacted with water. The conical jacket ends 40 in Figure 2 will accomplish this.

The following example illustrates the process of this invention in detail.

*Example*

A run was made in a unit having the general layout shown in Figure 1. Recording pH meters were installed between units in line 4. The cooling conduit consisted of a series of 19 units as shown in Figure 2, and they were approximately 66 feet high and 12 inches in diameter. In the event of leakage in any portion of the cooler, the location of the leak could be traced to one of the units and later found by inspection.

Water jackets in the first 14 legs were constructed to give a 5 ft. head of water in each; the last 5 legs were equipped with 3 ft. jackets because of the lower gas pressure. Under normal atmospheric conditions water exerts about 0.45 p. s. i. g. per foot of head; therefore maximum water pressure in the cooling jackets is about 2.25 p. s. i. g. Water was supplied at about 35° C. (ranging from 30 to 40° C.) to header 3 and adjusted to flow through each series of cooling jackets at from 30–40 gal. per minute. Product gases, from a reactor in which $TiCl_4$ was being oxidized with air, were fed into the cooling system through line 1. These gases containing suspended $TiO_2$ pigment particles were composed of chlorine, nitrogen, residual oxygen and hydrogen chloride resulting from the water vapor added to the oxidation reaction. The flow of materials in this stream at a reactor pressure of about 5 p. s. i. g. and a temperature of about 1300° C. was approximately as follows:

| | Lbs./hr. |
|---|---|
| $TiO_2$ | 3500 |
| $Cl_2$ | 6230 |
| $N_2$ | 10,050 |
| $O_2$ | 317 |
| HCl | 170 |

Recycled product gases were continuously fed at 3500 lbs./hr. These recycled gases were compressed in blower 10 to 10 p. s. i. g. at about 100° C. by regulating the blower speed. These cooled recycled gases were mixed with the reactor products, and they dropped the temperature of the resulting mixture to about 1000 to 1200° C. as it entered the first leg of the conduit. The temperature of the exiting reaction products from cooling conduit 2 was continuously measured and controlled at about 100° C. by the addition of scrubbing solids from hopper 14. These solids being coarser than the pigment product scour the conduit walls and improve the heat transfer. From 350 to 460 lb./hr. of coarse $TiO_2$ scrubbing solids were required to hold the desired effluent temperature. These scrubbing solids were added in controlled amounts about once every 2 minutes; larger amounts being used when the effluent gas temperature went above 100° C. The water leaving each cooling unit varied in temperature from 40 to 80° C. By-product gases were recovered from line 12 and solid $TiO_2$ was sent to the calciner 6 at about 3900 lbs./hr. During operation of this unit, the gas pressure in the pigment-gas stream dropped from 5 p. s. i. g. at the reactor exit to 2 to 3 p. s. i. g. at the conduit exit. Proper gas flow in the cooling system and its auxiliaries was determined by: (a) the fixed resistance characteristics of the apparatus, (b) control of the blower output pressure at 10 p. s. i. g., (c) control of the desired differential pressure across the blower by means of the pressure controlled re-cycle valve 17, and (d) setting of the metering valves 15 and 16. The above-described conditions are typical of the process of this invention, and when leaks subsequently occurred, they were detected quickly by the pH meters.

There are other modifications of the above-described system which could be used to carry out the process of this invention. However, they are not as practical. The conduit could consist simply of a long horizontal pipe located in a trough containing enough water to surround the pipe. If desired, the trough could be sectioned, with each section having a water inlet and outlet. This would make it possible to have means for detecting contamination at each water outlet, thereby making it easy to determine the exact location of the conduit section which is leaking.

In the preceding detailed description, the water was analyzed after it was removed from the cooling jackets. However, it should be understood that it is within the scope of this invention to analyze this water while it is still contained within the jackets. This could be accomplished by inserting the detecting means in the jackets or by the addition of pH indicators to the water as previously mentioned.

Water, of course, is the preferred cooling medium, but other liquid coolants would be operable. The water may contain other additives, such as acid indicators, corrosion inhibitors, or antifreeze agents such as ethylene glycol. If necessary, the detection means can be adjusted to compensate for such additives.

The use of the top-vented water jackets with fixed water levels as shown in Figure 2 offers decided advantages over other pressure controlling methods and is preferred. The fixed water level automatically controls the maximum water pressure, while the top vents prevent syphoning and accidental draining and serve as indicators to warn against overheating. The appearance of steam at a vent quickly indicates that the water at that point is dangerously near the boiling point, and an adjustment of the water flow should be made.

I claim:

1. An improved method for cooling the hot, gas-containing reaction products resulting from the oxidation of titanium tetrachloride which comprises passing said products through a conduit while contacting the exterior of said conduit with a continuously-supplied aqueous cooling liquid maintained at a pressure which is less than the adjacent pressure of the passing gases within said conduit, continuously removing cooling liquid from contact with said conduit, and analyzing said aqueous cooling liquid for contamination by materals from within said conduit.

2. An improved method for cooling the hot, gas-containing reaction products resulting from the oxidation of titanium tetrachloride which comprises passing said products through a conduit while contacting the exterior of said conduit with a continuously-supplied aqueous cooling liquid contained in top-vented jackets and maintained at a pressure less than the adjacent pressure of the passing gases within said conduit, continuously removing cooling liquid from said jackets and analyzing said aqueous cooling liquid for contamination by materials from within said conduit.

3. An improved method for cooling the hot, gas-containing reaction products resulting from the oxidation of titanium tetrachloride which comprises passing said products through a conduit while contacting the exterior of said conduit with a continuously-supplied aqueous cooling liquid contained in top-vented jackets at a level which gives a pressure less than the adjacent pressure of the passing gases within said conduit, continuously removing cooling liquid from said jackets through an overflow, and then analyzing said liquid to detect contamination by materials from within said conduit.

4. An improved method for cooling the hot, gas-containing reaction products resulting from the oxidation of titanium tetrachloride which comprises passing said products through a conduit while continuously contacting the exterior of said conduit with an aqueous cooling liquid maintained at a pressure which is less than that of the adjacent passing gases within said conduit, continuously removing cooling liquid from contact with said conduit, and analyzing said aqueous cooling liquid for contamination by materials from within said conduit.

References Cited in the file of this patent

UNITED STATES PATENTS

| Number | Name | Date |
|---|---|---|
| 1,247,209 | Bertsch | Nov. 29, 1917 |
| 2,488,439 | Schaumann | Nov. 15, 1949 |
| 2,653,078 | Lane | Sept. 22, 1953 |
| 2,658,728 | Evans | Nov. 10, 1953 |
| 2,670,272 | Nutting | Feb. 23, 1954 |
| 2,721,626 | Rick | Oct. 25, 1955 |